US010635818B1

(12) United States Patent
Rao

(10) Patent No.: US 10,635,818 B1
(45) Date of Patent: Apr. 28, 2020

(54) BLOCKING RUNTIME FIRMWARE VARIABLE ACCESS

(71) Applicant: American Megatrends International, LLC, Norcross, GA (US)

(72) Inventor: Srinivasan N. Rao, Norcross, GA (US)

(73) Assignee: American Megatrends International, LLC, Norcross, GA (US)

( * ) Notice: Subject to any disclaimer, the term of this patent is extended or adjusted under 35 U.S.C. 154(b) by 28 days.

(21) Appl. No.: 15/686,983

(22) Filed: Aug. 25, 2017

(51) Int. Cl.
*G06F 21/57* (2013.01)
*G06F 9/4401* (2018.01)
*G06F 12/02* (2006.01)
*G06F 21/53* (2013.01)

(52) U.S. Cl.
CPC .......... *G06F 21/572* (2013.01); *G06F 9/4401* (2013.01); *G06F 12/0246* (2013.01); *G06F 21/53* (2013.01); *G06F 2212/7201* (2013.01); *G06F 2221/2149* (2013.01)

(58) Field of Classification Search
CPC .. G06F 21/572; G06F 9/4401; G06F 12/0246; G06F 21/53; G06F 2212/7201; G06F 2221/2149
See application file for complete search history.

(56) References Cited

U.S. PATENT DOCUMENTS

| | | | |
|---|---|---|---|
| 2006/0129744 A1* | 6/2006 | Rothman | G06F 21/572 711/100 |
| 2015/0089238 A1* | 3/2015 | Lewis | G06F 21/44 713/183 |
| 2015/0235029 A1* | 8/2015 | Morishige | G06F 21/572 713/1 |
| 2017/0168851 A1* | 6/2017 | Lin | G06F 8/654 |
| 2019/0005273 A1* | 1/2019 | Taylor | G06F 21/85 |

OTHER PUBLICATIONS

Unified EFI Forum, Unified Extensible Firmware Interface Specification v 2.6, Jan. 2016. (Year: 2016).*

* cited by examiner

*Primary Examiner* — Jaweed A Abbaszadeh
*Assistant Examiner* — Brian J Corcoran
(74) *Attorney, Agent, or Firm* — Newport IP, LLC; Leonard J. Hope

(57) ABSTRACT

Technologies are disclosed herein for blocking access to some firmware variables during runtime. These firmware variables may be disallowed from runtime access (e.g., read/write access), by placing an indication of the firmware variables on a runtime blocklist. Upon completion of booting, runtime firmware services may access the runtime blocklist to determine if a firmware variable is to be accessed during runtime. In some cases, a firmware variable may be disallowed from runtime access by inclusion in the runtime blocklist, even if that firmware variable has an attribute that indicates that it is runtime accessible. The runtime blocklist may be generated based at least in part on indications of the firmware variables to be blocked during runtime. Additionally, runtime accessible firmware variables may be exposed to higher-level software, such as an O/S, if the firmware variables are not included in the runtime blocklist.

20 Claims, 6 Drawing Sheets

BLOCKING RUNTIME FIRMWARE VARIABLE ACCESS

BACKGROUND

Many computers utilize firmware, such as a basic input/output system ("BIOS") or universal extensible firmware interface ("UEFI"), when booting up the computer system, for initializing various services, such as recognizing devices (e.g., input/output ("I/O") devices) associated with the computer, initializing memory, initializing storage devices, etc. The firmware, in addition to enabling boot-up services, might also enable runtime services, such as enabling interaction between an operating system ("O/S") operating on the computer and the hardware of the computer. Such a firmware and its components (e.g., firmware components) are typically stored on a non-volatile memory device (e.g., NAND Flash, NOR Flash, EEPROM, etc.) of the computer.

There may be various variables associated with the firmware that may specify corresponding configuration information and/or functionality of the computer. Some of these variable values may be written and/or read to/from the non-volatile memory device during boot up of the computer. Others of these variables may be written and/or read during boot up and runtime.

In some cases, firmware variables may be incorrectly designated at build time, such as by a computer manufacturer, as having read and write (e.g., get and set functions) permissions during runtime of a computer system. This may result in improper access to firmware variables when the computer system is operating under the control of the O/S.

It is with respect to these considerations and others that the disclosure made herein is provided.

SUMMARY

The technologies disclosed herein provide functionality for preventing interaction with one or more firmware variables during runtime. Through an implementation of the disclosed technologies and mechanisms, firmware variable names for firmware variables that are not to be interacted with during runtime may be aggregated into a blocklist. Additionally, during runtime, the O/S and/or other software applications may be blocked from having access to the firmware variables that are on the runtime blocklist. Further, the firmware variables that are to be unavailable for access by higher-level software, such as the O/S, may be occluded from, or at least not exposed to, the O/S or other runtime software, such as at the exit of booting the computer system.

According to some example embodiments disclosed herein, firmware variables that are to be blocked from runtime access may be indicated all at once, such as by inclusion in a file listing all of the variable names corresponding to runtime blocked firmware variables. Alternatively, the runtime-blocked firmware variables may be indicated in a piecemeal manner. In either case, the runtime-blocked firmware variable names may be aggregated to generate and store a runtime blocklist, such as in non-volatile memory, such that the runtime blocklist may be accessed by one or more firmware services for determining which firmware variables are to be blocked from runtime access.

In further example embodiments, as disclosed herein, upon boot-up, a firmware service may expose to the O/S or other high-level software only the firmware variables that may be accessed during runtime. In yet further example embodiments, as disclosed herein, a firmware service may disallow access by the O/S or other high-level software during runtime of the runtime-blocked firmware variables.

In some example embodiments, the runtime-blocked firmware variables indicated on the runtime blocklist, occluded from the O/S, and/or for which access is blocked during runtime may erroneously have an attribute that indicates that the firmware variable is runtime accessible. Thus, as disclosed herein, in example embodiments, a mechanism is described that disallows the access to firmware variables that are to be blocked during runtime, even if those firmware variables are set with an incorrect runtime attribute that would otherwise allow access to those firmware variables during runtime.

The above-described subject matter may be implemented as a computer-controlled apparatus, a computer-implemented process, a computing system, or as an article of manufacture such as a non-transitory computer-readable storage medium. These and various other features will be understood from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
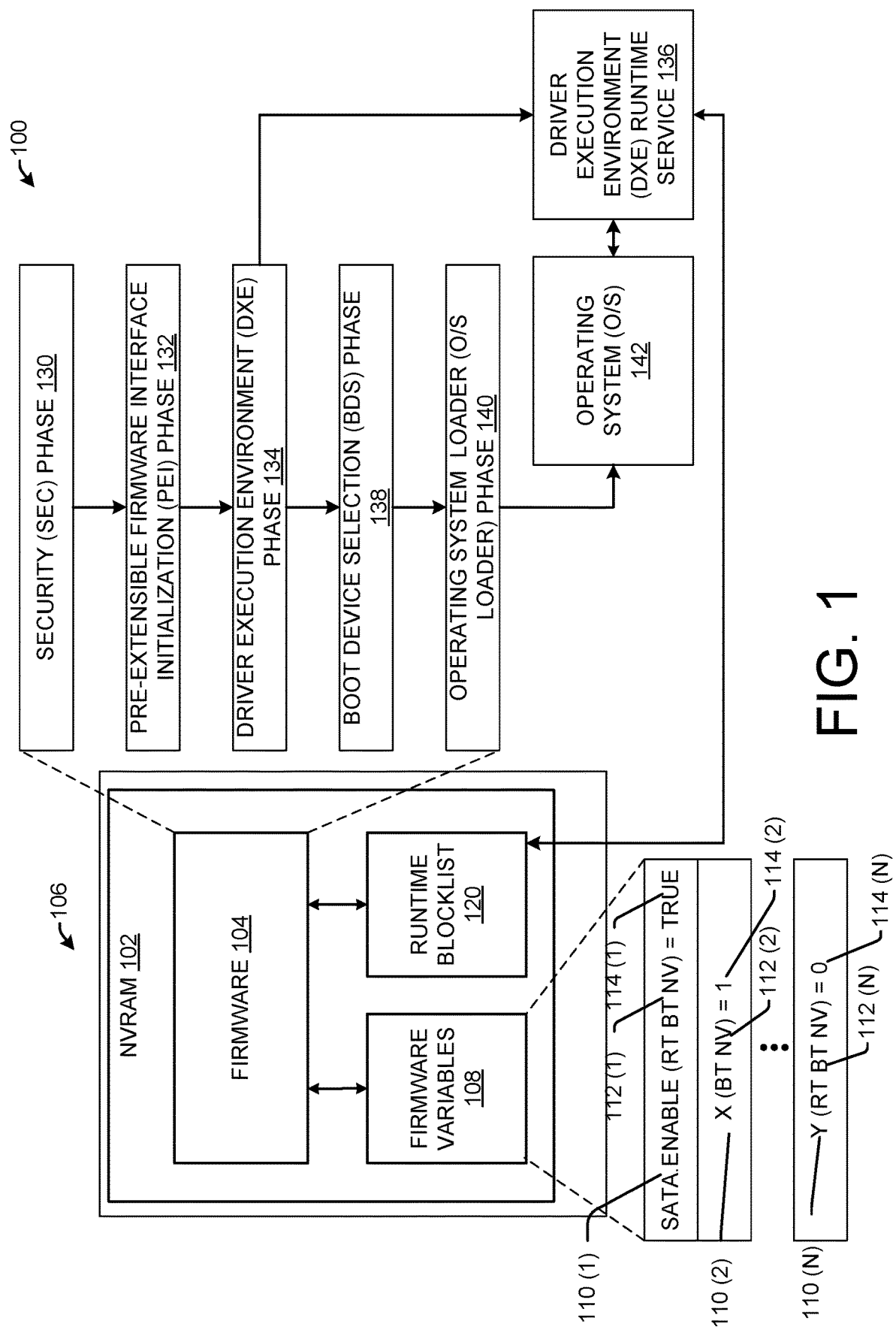
FIG. 1 is a block diagram showing an example computing environment with a firmware that provides boot-up services and runtime services where some firmware variables are blocked from access during runtime, according to example embodiments of the disclosure.

The following detailed description is directed to technologies for disallowing certain firmware variables from being modified and/or read during runtime, such as by the O/S or an application program running on a computer. In example embodiments, the instructions may be received by one or more processors, such as a central processing unit ("CPU") of a computer, to get or set a firmware variable.

During a get operation, the value of the firmware variable specified in the get instruction may be provided to the O/S and/or other runtime requesting entity if access to that runtime variable is allowed during runtime. During a set operation, a value may be written to the firmware variable specified in the set instruction on behalf of the O/S or other runtime requesting entity, if access to that firmware variable is allowed during runtime.

These get or set instructions may be received by the firmware, or a component thereof, operating during runtime, such as by a runtime driver execution component (e.g. a DXE Runtime Service) or any other suitable component of the firmware. The get or set instructions may be received from the O/S operating on the computer and/or other software (e.g., application programs) being executed by the computer on one or more processors of the computer.

According to example embodiments of the disclosure, the firmware and/or the components thereof operating on one or more processors of the computer, may disallow the get and/or set operation of firmware variables that are not to be modified during runtime, such as by the O/S. According to further example embodiments of the disclosure, the firmware and/or the components thereof operating on one or more processors of the computer may prevent exposing (e.g., hiding) firmware variables that are not to be modified during runtime by, or on behalf of, the O/S or other runtime software. According to yet further example embodiments of the disclosure, the firmware and/or the components thereof operating on one or more processors of the computer may generate and/or update a blocklist of firmware variables that are to remain inaccessible (e.g., static value and/or unreadable) during runtime.

According to some example embodiments, one or more processors of a computer may perform instructions stored in a program module, such as a component (e.g., function code) of an O/S, a component of an application operating on the computer, and/or a component of firmware, to generate and/or update and store a runtime blocklist.

The runtime blocklist may indicate one or more firmware variables that may not be modified and/or accessed during runtime, such as by the O/S or any other runtime application being executed by the one or more processors of the computer. The runtime blocklist may be generated based on receiving a listing of firmware variable names corresponding to firmware variables that are not to be interacted with during runtime.

The firmware variable names of the non-runtime accessible firmware variables may be received from any suitable entity, such as a manufacturer of the firmware, manufacturer of the computer, the O/S provider, etc. In some cases, the listing of non-runtime accessible firmware variable names may be received from more than one source. In some cases, each of the non-runtime accessible firmware variable names, and in other cases, the non-runtime accessible firmware variable names may be received in batches of any suitable number of elements.

After receiving the listing of non-runtime accessible firmware variable names, the non-runtime accessible firmware variable names may be aggregated to generate the runtime blocklist. In example embodiments, the runtime blocklist may be updated if additional non-runtime accessible firmware variable names are received after generating an initial runtime blocklist. The runtime blocklist may be stored, in example embodiments, in non-volatile memory, such as, for example, a non-volatile memory device on which the firmware is stored.

Each, or some, of the firmware variables associated with the firmware may have attributes associated with them that specify whether the firmware variable may be accessible during boot services, runtime, or both boot services and runtime. For example, a firmware variable may have attributes of "BT RT," indicating that that particular firmware variable may be accessible during both boot time ('BT") and runtime ("RT"). However, in some cases, there may be errors in the attributes, particularly if the attributes were assigned by an entity (e.g., firmware manufacturer) and should be modified according to another entity (e.g., computer manufacturer). In some cases, such errors may be hardcoded in hardware, and thus, may be relatively difficult to change.

According to example embodiments of the disclosure, the runtime blocklist, such as one stored in non-volatile memory, may provide an indication of firmware variables that may not be accessed during runtime. As such, according to the systems, methods, non-transitory computer readable media, and apparatus as disclosed herein, even if a 'RT' attribute is incorrectly set for a firmware variable, the inclusion of that firmware variable, as identified by a corresponding firmware variable name, in a runtime blocklist may disallow that firmware variable from being accessed (e.g., get or set operations) during runtime, such as by the O/S or other high-level (e.g., higher-level than firmware) applications.

While the subject matter described herein is presented in the general context of program modules and firmware components that execute in conjunction with the execution of an operating system and application programs on a computer system, those skilled in the art will recognize that other implementations can be performed in combination with other types of program modules.

Generally, program modules include routines, programs, components, data structures, and other types of structures that perform particular tasks or implement particular abstract data types. Moreover, those skilled in the art will appreciate that the subject matter described herein can be practiced with other computer system configurations, including handheld devices, multiprocessor systems, microprocessor-based or programmable consumer electronics, minicomputers, mainframe computers, and the like.

The subject matter described herein can be practiced in a distributed computing environment where tasks are performed by remote processing devices that are linked through a communications network, and wherein program modules may be located in both local and remote memory storage devices. It should be appreciated, however, that the implementations described herein can also be utilized in conjunction with stand-alone computer systems and other types of computing devices. It should also be appreciated that the embodiments presented herein can be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several FIGURES, aspects of a computing system and methodology for identifying and resolving dependencies between components in a firmware project will be described.

FIG. 1 is a block diagram showing an example environment 100 with a firmware 104 that provides boot-up services and runtime services where some firmware variables are blocked from access during runtime, according to example embodiments of the disclosure. The firmware 104, and components thereof, may be stored on non-volatile random access memory ("NVRAM") 102, or any other suitable non-volatile memory or storage.

The firmware 104 may be of any suitable type including, but not limited to, basic input/output system ("BIOS"), extensible firmware interface ("EFI"), universal extensible firmware interface ("UEFI"), Open Firmware, combinations thereof, or the like. The firmware 104 and the functionality thereof may be incorporated as part of any suitable computing system 106 including, but not limited to, servers, desktop computers, laptop computers, netbook computers, set-top-boxes, gaming consoles, Wi-Fi routers, smartphones, wearable computers, smart appliances, home automation/control systems, vehicle infotainment systems, combinations thereof, or the like.

The firmware 104 and/or components thereof may enable boot-up services and/or runtime services for computing systems with any suitable type of one or more processors including, but not limited to INTEL ARCHITECTURE ("IA") processors from INTEL CORP., processors from ADVANCED MICRO DEVICES ("AMD"), POWERPC/POWER ARCHITECTURE processors and/or Microcontrollers, ARM PROCESSORS, processors and/or microcontrollers from FUJITSU, ST MICROELECTRONICS, FREESCALE SEMICONDUCTOR, INTERNATIONAL BUSINESS MACHINES ("IBM"), TEXAS INSTRUMENTS, QUALCOMM, BROADCOM, SAMSUNG, ORACLE CORP./SUN MICROSYSTEMS, any variety of single-core processors, any variety of multi-core processors, central processing units ("CPUs"), microcontrollers, embedded processors, combinations thereof, or the like. As a nonlimiting example, the firmware may be manufactured by PHOENIX TECHNOLOGIES, or any other suitable manufacturer of firmware.

The firmware variables 108 may convey a number of different types of system information that may be used by the firmware 104 for the purposes of boot-up of the computing system 106 and/or for runtime services. For example, the firmware variables may indicate the type and/or size of volatile memory of the computing system 106, the type of buss(es), the type and/or size of storage drives, etc. in the computing system 106.

In some example embodiments, the firmware variables 108, along with their corresponding identifiers 110(1), 110(2), . . . 110(N), hereinafter referred to individually or collectively as firmware variable identifiers 110, their corresponding attributes 112(1), 112(2), . . . , 112(N), hereinafter referred to individually or collectively as firmware variable attributes 112, and their values 114(1), 114(2), . . . , 114(N), hereinafter referred to individually or collectively as firmware variable values 114, may be stored on the NVRAM 102.

The firmware variable identifier 110 may be a globally unique identifier ("GUID"), a firmware name, or any suitable identifier. The firmware variable attributes 112 may indicate whether the corresponding firmware variable is to be accessed in runtime (e.g., by setting an RT attribute), accessed in boot-up (e.g., by setting a BT attribute), and/or stored in NVRAM (e.g., by setting a NV attribute). In example embodiments, firmware attributes 112 may indicate other properties of corresponding firmware. The firmware variable 114 may be any suitable values, such as a single bit, multiple bits, a Boolean value, any alpha-numeric value, and/or the like. The depicted firmware variable names 110(1), 110(2), 110(N) are examples. There may be any suitable number and/or type of firmware variables 108 associated with the firmware 104 and system 106.

According to example embodiments of the disclosure, a runtime blocklist 120 may be generated and/or used to identify and/or block firmware variables 108 that are to have restrictions to access during runtime. In example embodiments, the runtime blocklist 120 may be stored on the NVRAM 102 and/or any other suitable location. The runtime blocklist 120 may include a listing of firmware variable identifiers 110 of firmware variables 108 that may not be read (e.g., get function) and/or written (e.g., set function) during runtime operation of the system 106 incorporating the firmware 104.

The firmware 104 may perform a variety of functions to enable boot-up and/or runtime of the computing system in which the firmware 104 is incorporated. In some example embodiments, the boot-up functions may include a security phase ("SEC") 130, a pre-extensible firmware interface initialization ("PEI") phase 132, a driver execution environment ("DXE") phase 134, a boot device select ("BDS") phase 138, and an operating system loader ("O/S Loader") phase 140. It will be appreciated that these phases 130, 132, 134, 138, 140 may be UEFI specific. According to other embodiments of the disclosure, other pre-runtime functions may be performed for non-UEFI type firmware, such as BIOS, EFI, and/or any other suitable firmware.

In other example embodiments according to the disclosure, there may be fewer, additional, and/or subdivisions of the aforementioned phases 130, 132, 134, 138, 140 of the boot-up services. During each of the SEC phase 130, PEI phase 132, DXE phase 134, and BDS phase 138 various functions of booting up the system in which the firmware 104 is provided may be performed such that the system may operate in runtime under the control of an operating system 144. During the DXE phase 134, a variety of drivers may be loaded. Additionally, DXE Runtime Services 136 may be launched during boot-up and may remain resident during runtime. Runtime, according to example embodiments, may be the time after the firmware 104 hands off control of the system 106 to the O/S 142. In other words, runtime is the time period during which the system 106 operates under the control of the O/S 142 after boot time. The DXE Runtime Services 136 may provide a variety of functions to, and operate as an interface between, the runtime higher-level software (e.g., O/S 142) and the firmware 104 and/or hardware of the system 106 in which the firmware 104 is incorporated.

Upon the O/S Loader phase loading the O/S, the system 106 having the firmware 104 may exit boot services. The exit of boot services may provide an indication (e.g., updated state, flag bit, and/or interrupt, etc.). The system may now be in runtime, where an O/S 142 (e.g., MICROSOFT WINDOWS, REDHAT LINUX, etc.) may be providing an interface between other applications operating on the system and the firmware 104 and/or hardware of the system. The DXE Runtime Service 136, as operating on one or more processors of the system 106 on which the firmware 104 resides, may still be operational during runtime to provide a variety of services to the O/S 142 and/or to other high-level software operating on the system. The DXE Runtime Service 136 may be called upon, such as by the O/S 142 or other runtime operations to provide runtime services, such as accessing (e.g., get or set) firmware variables 108.

The DXE Runtime Service 136 may have access to the runtime blocklist 106, which in some example embodiments may be stored on the NVRAM 102. The DXE Runtime Service 116 may be configured to receive a request, such as from the O/S 142 and/or application software operating on the system, to get or set a particular firmware variable, and then perform a check to determine if the particular firmware variable is to be accessed during runtime 124. This access-check operation may entail checking the attributes of the particular firmware variable.

The attribute 112 that indicates runtime access blocking of the particular firmware variable 108 may be, for example, that an RT parameter associated with the particular firmware variable is not set. If the attribute 112 indicates that the particular firmware variable is not to be accessed during runtime, then access to the particular firmware variable may be disallowed and the request to get or set the particular firmware variable value 114 may not be fulfilled.

According to example embodiments of the disclosure, access to the particular firmware variable may be blocked even if the attribute(s) 112 (e.g., RT parameter) do not indicate that the particular firmware variable 108 is to be blocked from runtime access by the O/S 142. After the attributes of the particular firmware variable are checked, the DXE Runtime Service 136 may access the runtime blocklist 106 to determine if the firmware variable name of the particular firmware variable is included in the runtime blocklist 106. If the particular firmware variable is indeed included in the runtime blocklist 120, then access to the particular firmware variable may be disallowed during runtime, such as by the O/S 142, even if the attributes for that particular firmware variable indicates allowed access during runtime.

According to example embodiments, as described herein, the DXE Runtime Service 136 may verify both that the RT attribute is set for a firmware variable 108 and that that firmware variable 108 is not included on the runtime blocklist 120 prior to enabling the access of that firmware variable 108 during runtime. It will be appreciated that according to this mechanism, firmware variable 108, access to which are to be blocked, may be blocked even if their RT attribute 112 is improperly set. Thus, a system provider and/or OEM may be able to provide a system 106 where certain firmware variables 108 are runtime-blocked without having to reset the RT attributes 112 of those firmware variables 108.

Further, during boot-up, such as, for example, at exit of boot services, a listing of firmware variables accessible to the O/S 142 or other higher-level software for interfacing with the hardware during runtime may be exposed. According to example embodiments of the disclosure, the exposure of the firmware variables 108 may be gated according to the runtime blocklist 120. In other words, only those firmware variables that are not indicated on the runtime blocklist 120 and that have a runtime attribute 112 may be exposed to the O/S 142 and/or other higher-level software during runtime.

In example embodiments, the runtime blocklist 120 may be generated, updated, and/or otherwise modified by any suitable entity. For example, the runtime blocklist 120, in example embodiments, may be generated and/or modified by a firmware utility program, via an application program interface ("API") for the O/S or other higher-level software, during boot-up, during runtime, as part of a manufacturing/factory mode, during field-level firmware updates, during remote firmware updates, any combination thereof, or the like.

Figure 2:
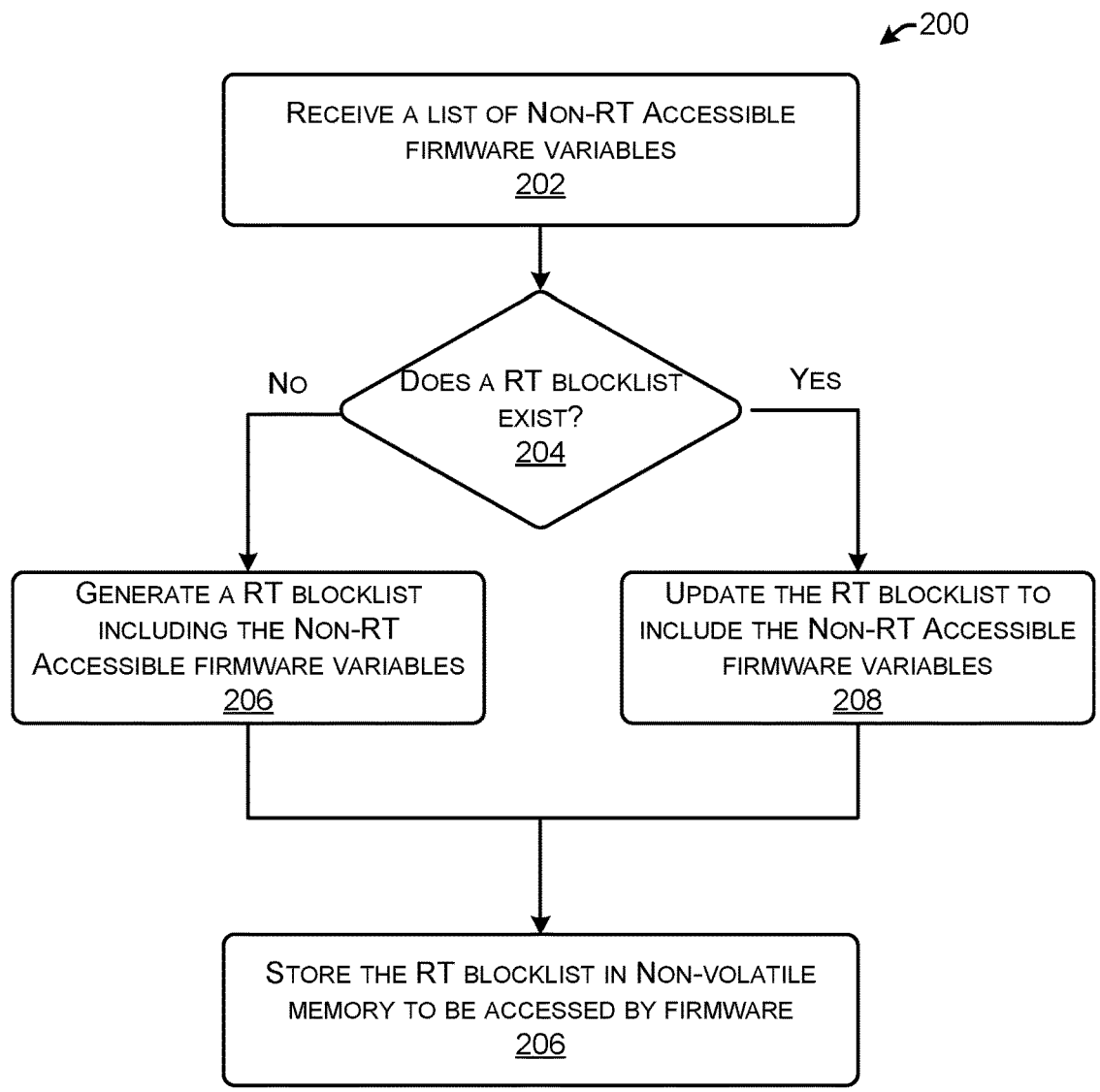
FIG. 2 is a flow diagram illustrating an example method to generate and store a runtime blocklist, according to example embodiments of the disclosure.

FIG. 2 is a flow diagram illustrating an example method 200 to generate and store a runtime blocklist 120, according to example embodiments of the disclosure. The method 200 may be performed on one or more processors associated with the system 106 incorporating firmware 104, as described herein. The performance of method 200 may be enabled by any one of, or combination of, boot-up utilities, runtime utilities, manufacturing utilities, factory utilities, field-service utilities, and/or remote-service utilities.

At block 202, a list of non-runtime accessible firmware variables 108 may be received. Each of the non-runtime accessible firmware variables may be referenced by a corresponding firmware variable name. The indication of the non-runtime accessible firmware variables may be in any suitable form, such as a text file, extensible markup language ("XML") file, a comma separated file, a binary file, combinations thereof, or the like. The blocked firmware variable may be identified based at least in part on the blocked firmware variable names received.

At block 204, it may be determined if a runtime blocklist 120 already exists. This might be determined by accessing the NVRAM 102 to identify if a runtime blocklist 120 is stored thereon. Alternatively, the existence of a runtime blocklist 120 may be determined based at least in part on a flag, such as in a register and/or in the NVRAM 102, set to indicate the same. If it is determined at block 204 that a runtime block list 120 is not present, then at block 206, a runtime blocklist 120 including the non-runtime accessible firmware variables may be generated. The blocklist 120 may be generated by aggregating, and optionally formatting, a file containing an indication (e.g., firmware variable name) of the firmware variables that are to be blocked from access during runtime.

If it is determined at block 204, that a runtime blocklist 120 already exists, then at block 208, the existing runtime blocklist 120 may be updated with any new names of firmware variables that are to be runtime-access blocked. In example embodiments, this may entail obtaining the existing runtime blocklist 120, such as from non-volatile memory 102, and adding the names of additional firmware variables 108 that are to be blocked for runtime access. At block 206, the runtime blocklist 120 may be stored in non-volatile memory 102 such that it is accessible by the firmware 104. The stored runtime blocklist 120 may be either the updated version of the runtime blocklist 120 from the operations of block 208, or a newly generated runtime blocklist from the operations of block 206.

Figure 3:
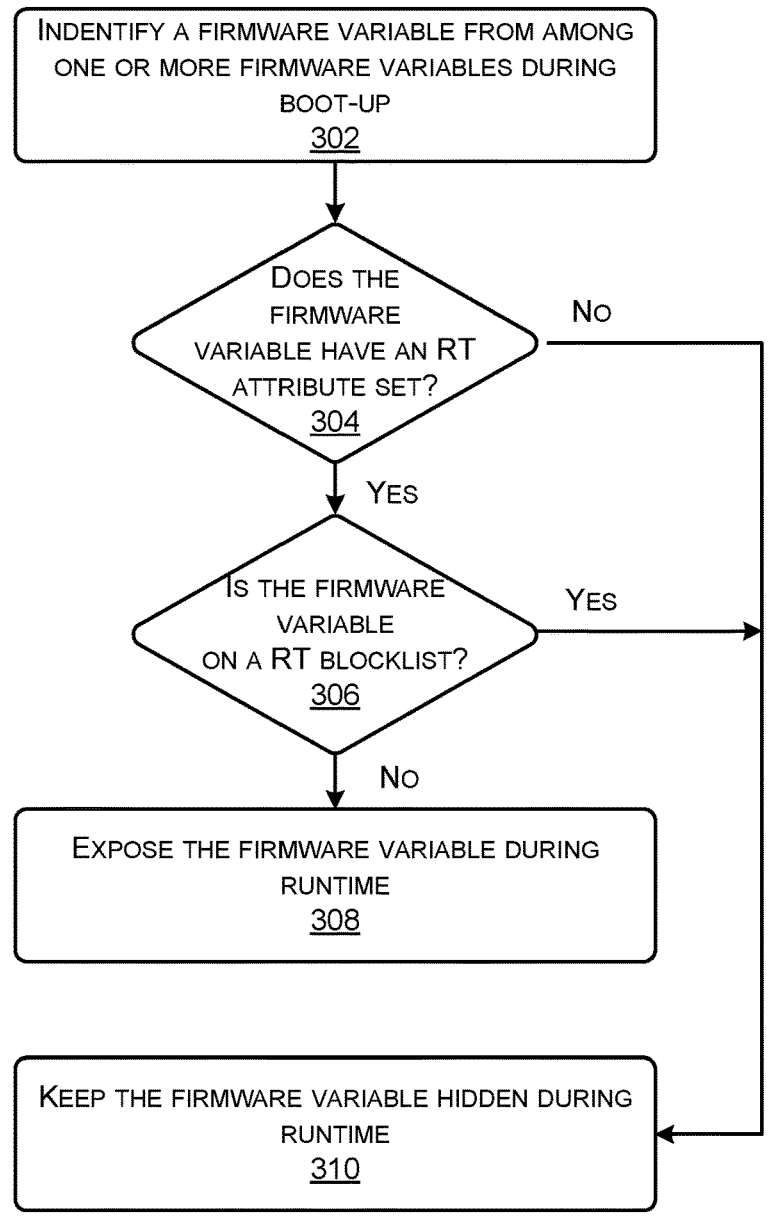
FIG. 3 is a flow diagram illustrating an example method for exposing firmware variables to an operating system during runtime, according to example embodiments of the disclosure.

FIG. 3 is flow diagram illustrating an example method 300 for exposing firmware variables to an operating system during runtime, according to example embodiments of the disclosure. The method 300 may be performed on one or more processors associated with a system 106 incorporating firmware 104, as described herein. Method 300 performs a process to determine if a particular firmware variable 108 is to be exposed to an O/S 142 or other runtime software. In example embodiments, the method 300 may be repeated for each of the firmware variables to determine if each of those firmware variables are to be exposed during runtime.

At block 302, a firmware variable from among one or more firmware variables 108 may be identified during boot-up. There may be any suitable number of firmware variables 108, and it will be appreciated that method 300 may be repeated for each of the one or firmware variables. The firmware variables may be selected in any suitable order, or any suitable mechanism.

At block 304, it may be determined if the identified firmware variable has a runtime attribute set 112. For example, a firmware variable, X 110, may have attributes defined as "Y(BT+RT+NV)" 112, where firmware variable name Y 110 may have attributes 112 of boot-time accessible, runtime accessible, and stored in NVRAM. Thus, in this example, the runtime attribute 112 of firmware variable Y 110 is set. As another example, a firmware variable, X 110, may be designated as "X(BT+NV)," where the runtime attribute 112 is not set.

If the firmware variable does not have a runtime attribute set 112, then the method 300 may proceed to block 310, where the firmware variable may be kept hidden during runtime. In other words, the firmware variable 108, or the corresponding firmware variable name 110 may not be provided to the O/S 142 or other higher-level software as a firmware variable that may be accessible during runtime.

If, however, at block 304, if it is determined that the runtime attribute 112 for the firmware variable is set, then the method 300 may proceed to block 306, where it may be determined if the firmware variable 108 is on a runtime blocklist. For this operation, the runtime blocklist 108 may be accessed, such as from the nonvolatile memory 102.

At block 306, if it is determined that the firmware variable is on a runtime blocklist, then the method 300 may proceed to block 310, where the firmware variable is kept hidden from higher-level software (e.g., the O/S 142) during runtime. At block 306, if it is determined that the firmware variable 108 is not on a runtime blocklist 120, then the method 300 may proceed to block 308 where the firmware variable 108 is exposed during runtime.

Figure 4:
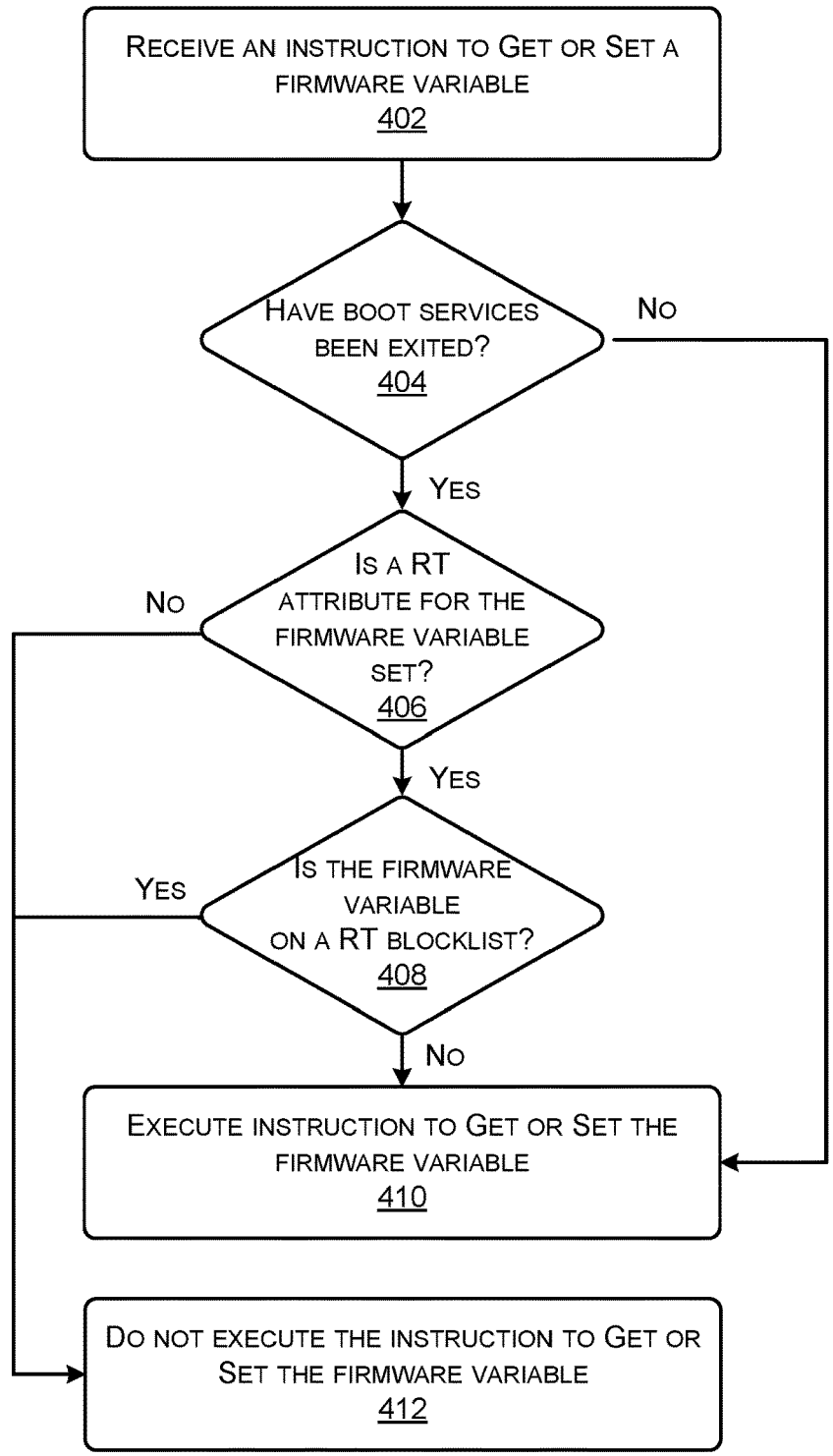
FIG. 4 is a flow diagram illustrating an example method for responding to get or set instruction, according to example embodiments of the disclosure.

FIG. 4 is flow diagram illustrating an example method 400 for responding to get or set instruction, according to example embodiments of the disclosure. The method 400 may be performed on one or more processors associated with a system 106 incorporating firmware 104, as described herein, such as by a firmware runtime service (e.g., DXE 134, DXE-Runtime Service 136, etc.).

At block 402, an instruction to get or set a firmware variable 108 may be received. An instruction to get the firmware variable 108 may be a request to return a current value 114 of the firmware variable 108, as indicated in the get instruction, such as by referencing a firmware variable name 110 of the firmware variable 108. An instruction to set the firmware variable 108 may be a request to write a particular value 114 to the firmware variable 108, as indicated in the set instruction, such as by referencing a firmware variable name 110 of the firmware variable 108 and providing the value 114 to which the firmware variable 108 is to be set. Such get or set instructions may be received from entities that either operate during boot-up or during runtime.

At block 404, it may be determined if boot services have been exited. Such a determination may be made in any suitable manner, such as determining if exit boot services has occurred from a system level flag and/or interrupt signal, if the system 106 is under control of the O/S 142, or any other suitable mechanism. If boot services have not been exited, then the method 400 may proceed to block 410, where the instruction to get or set the firmware variable 108 may be executed. On the other hand, if at block 404 it is determined that boot services have been exited, then the method 400 may proceed to block 406, where it may be determined if a runtime attribute 112 for the firmware variable 108 is set.

If it is determined, at block 406, that the runtime attribute 112 is set for the firmware variable 108, then at block 408, it may be determined if the firmware variable 108 is on a runtime blocklist 120. If the firmware variable 108 is not on the runtime blocklist 120, then the method 400 may proceed to block 410, where the instruction to get or set the firmware variable 108 may be executed. However, if at block 408 it is determined that the firmware variable is on a blocklist, then at block 412, the instruction to get or set the firmware variable 108 is not executed. It will be appreciated that in some example embodiments, the order of checking if the firmware variable is on a runtime blocklist, such as in the operations of block 408, and if the a runtime attribute is set for the firmware variable, such as in the operations of block 406, may be reversed.

Figure 5:
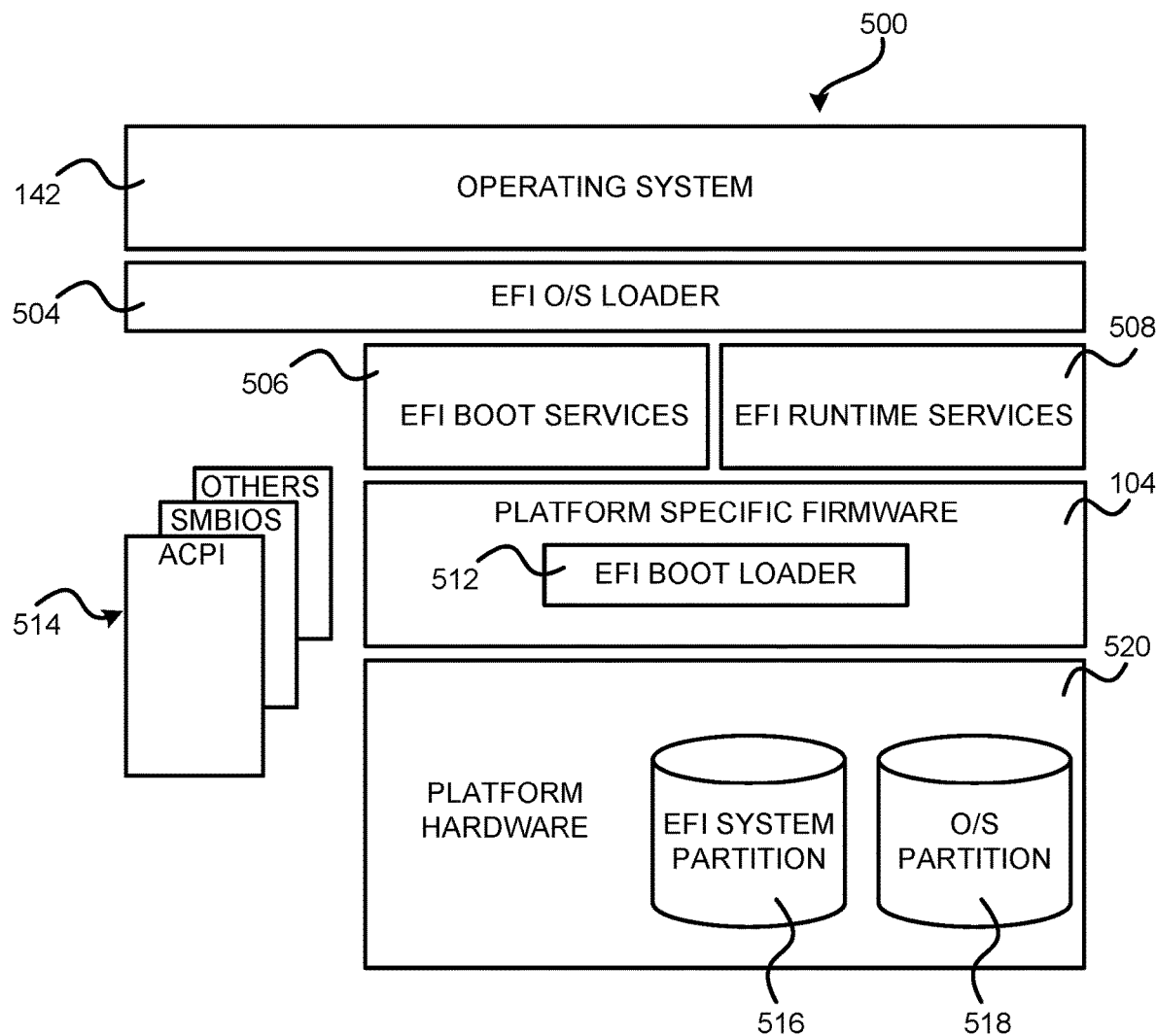
FIG. 5 is a software architecture diagram illustrating an example software architecture for an extensible firmware interface ("EFI")-compliant firmware that provides an operating environment for the technologies presented herein, according to example embodiments of the disclosure.

Turning now to FIG. 5, a software architecture diagram 500 is described that illustrates an architecture for a UEFI Specification-compliant firmware 104 according to technologies disclosed herein. The UEFI Specification describes an interface between an operating system 142 and a UEFI Specification-compliant firmware 104. The UEFI Specification also defines an interface that the firmware 104 can implement, and an interface that the operating system 142 can use while booting. How the firmware 104 implements the interface can be left up to the manufacturer of the firmware 104. The UEFI Specification also defines a way for the operating system 142 and firmware 104 to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520 and an operating system 142. The operating system ("O/S") image can be retrieved from the UEFI system partition 516 using an UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI O/S loader 504 can continue to boot the complete operating system 502. In doing so, the UEFI O/S loader 504 can use UEFI boot services 506, an interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 506 can provide interfaces for devices and system functionality used during boot time. UEFI runtime services 508 can also be available to the UEFI O/S loader 504 during the boot phase. For example, a set of runtime services can be presented to ensure appropriate abstraction of base platform hardware resources used by the operating system 502 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 6:
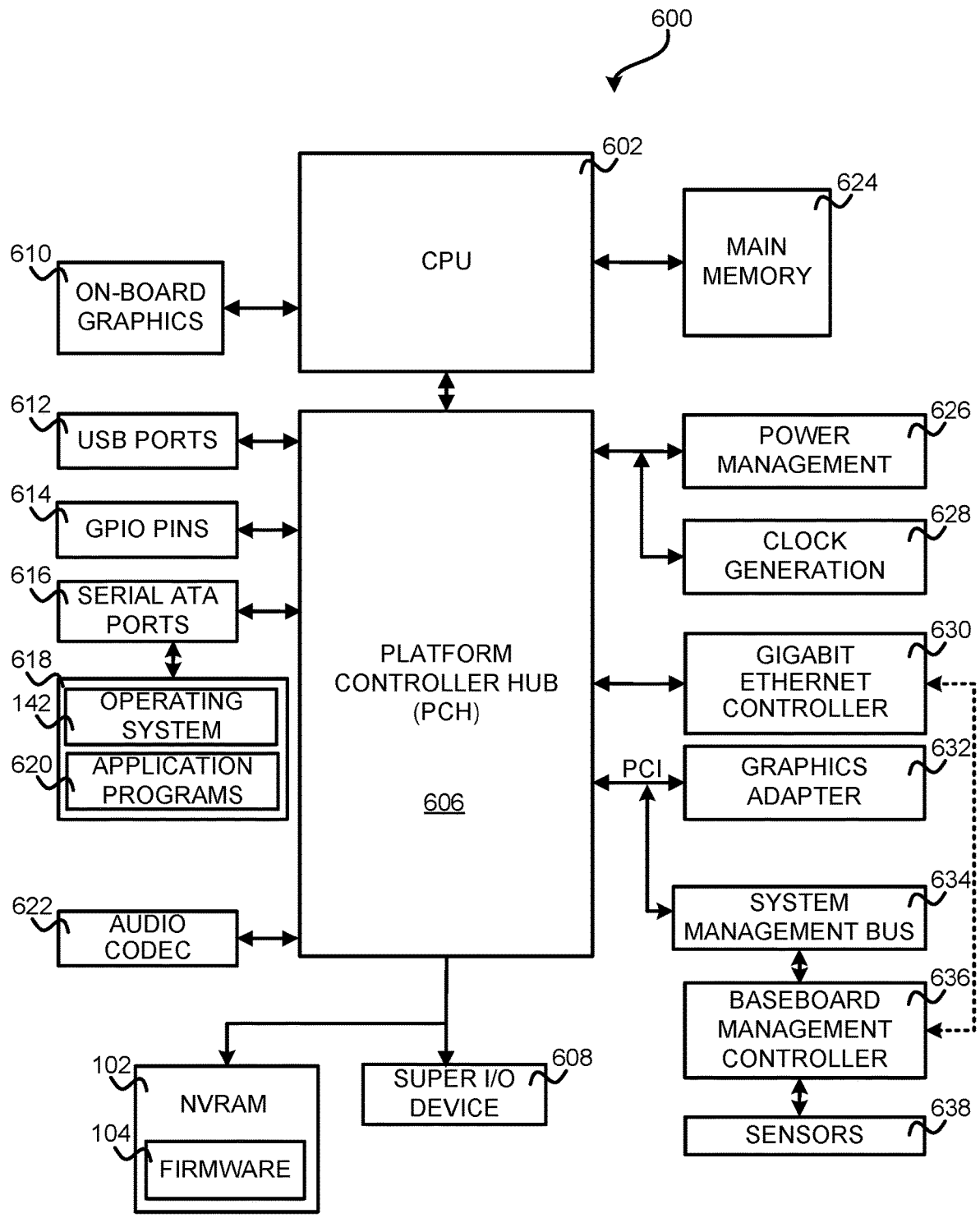
FIG. 6 is a computer architecture diagram that shows an illustrative architecture for a computer that can provide an operating environment for the technologies disclosed herein, according to example embodiments of the disclosure.

Referring now to FIG. 6, a computer architecture diagram that illustrates an illustrative architecture 600 for a computer that can provide an illustrative operative environment for the technologies presented herein will be described. FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or motherboard, which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 632. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC'97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to a configuration, the PCH 606 includes a serial advanced technology attachment ("SATA") adapter for providing one or more serial ATA ports 616. The serial ATA ports 616 can be connected to one or more mass storage devices storing an OS, such as OS 502 and application programs, such as a SATA disk drive 618. As known to those skilled in the art, an OS comprises a set of programs that control operations of a computer and allocation of resources. An application program is software that runs on top of the operating system software 502, or other runtime environment, and uses computer resources to perform application specific tasks desired by the user.

According to one configuration, the O/S 142 comprises the LINUX operating system. According to another configuration, the O/S 142 comprises the WINDOWS operating system from MICROSOFT CORPORATION. According to another configuration, the O/S 142 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 102 for storing firmware 104 that includes program code containing the basic routines that help to start up the computer 600 and to transfer information between elements within the computer 600. The firmware 104 can be a multi-platform firmware.

It should be appreciated that the program modules disclosed herein, including the firmware 604, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 102. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller ("BMC") 636. In general, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600.

To accomplish these monitoring functions, the BMC 636 is communicatively connected to one or more components by way of the system management bus 634.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Although the subject matter presented herein has been described in language specific to computer structural features, methodological acts, and computer readable media, it is to be understood that the present disclosure is not necessarily limited to the specific features, acts, or media described herein. Rather, the specific features, acts and mediums are disclosed as example forms.

Although the methods as described with reference to the flow diagram illustrated in FIGS. 2-4, many other operations for performing the acts associated with the methods may be used. For example, the order of the operations may be changed, some of the operations described may be optional, and additional operations may be included, in accordance with example embodiments of the disclosure.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
receiving, by one or more processors, a first request to access a first firmware variable during runtime of a computing device, the first request comprising a first firmware variable identifier corresponding to the first firmware variable;
determining, responsive to the first request, whether a table associated with the computing device indicates that access to the firmware variable is permitted during runtime;
responsive to determining that the table associated with the computing device indicates that access to the first firmware variable is permitted during runtime, determining that the first firmware variable identifier is included in a runtime blocklist; and
blocking access to the first firmware variable during runtime, responsive to determining that the first firmware variable identifier is included in the runtime blocklist.

2. The method of claim 1, wherein the first firmware variable has a corresponding first runtime attribute set.

3. The method of claim 1, wherein the one or more processors are operating in runtime under control of an operating system.

4. The method of claim 1, wherein the runtime blocklist is retrieved from a non-volatile memory accessible to the one or more processors.

5. The method of claim 1, further comprising:
receiving, by the one or more processors, a second request to access a second firmware variable, the second request including a second firmware variable identifier corresponding to the second firmware variable;
determining that the second firmware variable identifier is not included in the runtime blocklist;
determining, based at least in part on the second firmware variable identifier not being included in the runtime blocklist, that the second request is to be performed; and
accessing the second firmware variable responsive to determining that the second request is to be performed.

6. The method of claim 5, wherein the determining that the second request is to be performed is further based at least in part on determining that the second firmware variable has a second runtime attribute set.

7. The method of claim 1, further comprising:
receiving, by the one or more processors, a second request to access a second firmware variable; and
accessing the second firmware variable, wherein the one or more processors are operating in a boot-up mode.

8. An apparatus, comprising:
at least one processor; and
a computer-readable storage medium having instructions stored thereupon that are executable by the processor and which, when executed by the processor, cause the apparatus to:
receive a first request to access a first firmware variable during runtime of a computing device, the first request including a first firmware variable identifier corresponding to the first firmware variable;
determine, responsive to the first request, whether a table associated with the computing device indicates that access to the firmware variable is permitted during runtime;
responsive to determining that the table associated with the computing device indicates that access to the first firmware variable is permitted during runtime, determine that the first firmware variable identifier is included in a runtime blocklist; and
block access to the first firmware variable during runtime, responsive to determining that the first firmware variable identifier is in the runtime blocklist.

9. The apparatus of claim 8, wherein the first firmware variable has a corresponding first runtime attribute set.

10. The apparatus of claim 8, wherein the apparatus is operating in runtime under control of an operating system.

11. The apparatus of claim 8, wherein the computer-readable storage medium has further instructions stored thereupon to:
receive a second request to access a second firmware variable, the second request including a second firmware variable identifier corresponding to the second firmware variable;
determine that the second firmware variable identifier is not included in the runtime blocklist;
determine, based at least in part on the second firmware variable identifier not being included in the runtime blocklist, that the second request is to be performed; and
access the second firmware variable responsive to determining that the second request is to be performed.

12. The apparatus of claim 11, wherein to determine that the second request is to be performed is further based at least in part on determining that the second firmware variable has a second runtime attribute set.

13. The apparatus of claim 8, wherein the computer-readable storage medium has further instructions stored thereupon to:
receive a second request to access a second firmware variable;
determine that a second runtime attribute corresponding to the second firmware variable is not set; and
block access to the second firmware variable responsive to the second runtime attribute not being set.

14. The apparatus of claim 8, wherein the computer-readable storage medium has further instructions stored thereupon to:
receive a second request to access a second firmware variable; and
access the second firmware variable, wherein the processor is operating in a boot-up mode.

15. A non-transitory computer-readable storage medium having instructions stored thereupon which, when executed by a processor, cause the processor to:
receive a first request to access a first firmware variable during runtime of a computing device, the first request including a first firmware variable identifier corresponding to the first firmware variable;
determine, responsive to the first request, whether a table associated with the computing device indicates that access to the firmware variable is permitted during runtime;
responsive to determining that the table associated with the computing device indicates that access to the first firmware variable is permitted during runtime, determine that the first firmware variable identifier is not included in a runtime blocklist;
determine, based at least in part on the first firmware variable identifier not being included in the runtime blocklist, that the first firmware variable is accessible while the processor is operating during runtime; and
provide access to the first firmware variable during the runtime.

16. The non-transitory computer-readable storage medium of claim 15, wherein providing the access to the first firmware variable comprises accessing a value of the first firmware variable.

17. The non-transitory computer-readable storage medium of claim 15, wherein determining that the first firmware variable is accessible while the processor is operating during runtime further comprises the processor determining that the first firmware variable has a corresponding first runtime attribute set.

18. The non-transitory computer-readable storage medium of claim 15, having further computer-readable instructions stored thereupon to:
receive a second request to access a second firmware variable, the second request including a second firmware variable identifier corresponding to the second firmware variable;
determine that the second firmware variable identifier is included in the runtime blocklist; and
block access to the second firmware variable responsive to determining that the second firmware variable is included in the runtime blocklist.

19. The non-transitory computer-readable storage medium of claim 18, wherein the second firmware variable has a corresponding second runtime attribute set.

20. The non-transitory computer-readable storage medium of claim 15, having further computer-readable instructions stored thereupon to:
receive a second request to access a second firmware variable, the second request including a second firmware variable identifier corresponding to the second firmware variable;
determine that the second firmware variable does not have a corresponding second runtime attribute set; and
block access to the second firmware variable responsive to determining that the second runtime attribute is not set.

\* \* \* \* \*